United States Patent Office 3,784,668
Patented Jan. 8, 1974

1

3,784,668
MELT BLENDED POLYETHYLENE-ETHYLENE COPOLYMER POLYBLENDS
William K. Neidinger, Columbus, Ind., assignor to Amos-Thompson Corporation, Edinburg, Ind.
No Drawing. Original application June 4, 1970, Ser. No. 43,591, now abandoned. Divided and this application July 23, 1971, Ser. No. 165,726
Int. Cl. B29c 5/04; B29b 5/04
U.S. Cl. 264—310                           2 Claims

ABSTRACT OF THE DISCLOSURE

Claimed is a process of rotational molding of high density polyethylene and ethylene-polar monomer polyblends produced by a melt blend technique. Such polyblends have a high density polyethylene content of from about 50 to 95 percent by weight and an ethylene-polar monomer content of from about 50 to 5 percent by weight. These melt blended polyblends substantially retain the beneficial properties of high density polyethylene with the ethylene-polar monomer enhancing the stress-crack resistance and, unexpectedly, their improved stress-crack resistance is retained in rotational mold processing of the blends.

---

This application is a division of Neidinger U.S. patent application Ser. No. 43,591 filed June 4, 1970 titled "Melt Blended Polyethylene Copolymer Polyblends," now abandoned.

BACKGROUND OF THE INVENTION

This invention relates to melt blends of high density polyethylene and ethylene-polar monomer copolymers (polyblends). Further in another mode this invention relates to a melt blend composition (polyblend) containing from about 95 to 50 percent by weight of high density polyethylene and from 5 to 50 percent by weight of an ethylene-polar monomer copolymer; and the use of this composition to produce rotationally molded articles.

Polyethylene, and particularly high density polyethylene is very useful in molding many types of articles. High density polyethylene has a substantial structural stability, rigidity, resistance to cold flow and greater resistance to high temperatures than other polyethylenes resulting in uses which had been relegated to other polymeric materials. However as the density of polyethylene increases the stress-crack resistance decreases. There is further the disadvantage that the temperatures necessary for molding high density polyethylenes approach those of polymer degradation. Various techniques have been attempted in an effort to solve these problems. One such solution for improving the stress-crack resistance is set out in U.S. Pat. 3,464,941. This comprises the addition of a fatty acid diamine to the polyethylene. While this does improve the stress-crack resistance, there remains the further problem of high temperatures necessary for molding. Some of these other problems have been approached and partially solved by dry blending high density polyethylene with low density polyethylene or with ethylene-vinyl acetate copolymer powders. However the problem here remains that it has not been possible to produce a homogeneous, compatible polymer mixture suitable for rotationally molding many articles.

These problems and others have been solved by the present invention. In the present invention by using a high density polyethylene and ethylene-polar monomer copolymer polyblend produced by a melt blend technique the problems of stress-crack resistance and compatibility are solved; the polymer polyblend mixture is workable in a temperature range sufficiently below the point of degradation, and the polymer polyblend retains the beneficial general properties of high density polyethylene such as superior low temperature ($-100°$ C.) properties. In any comparisons with polypropylene and/or polybutylene, polyethylene is far superior in low temperature properites.

It is an object of this invention to produce a high density polyethylene polyblend readily useable for rotational molding.

It is further an object of this invention to produce a high density polyethylene polyblend having a high stress-crack resistance while maintaining the low temperature properties of high density polyethylene.

It is yet further an object of this invention to set out a melt blend technique whereby a high density polyethylene and an ethylene-vinyl polar monomer copolymer polyblend is produced and which is characterized by high stress-crack resistance, good low temperature properties and exceptional compatibility.

It is another object of this invention to set out a particularly suitable polyblend mixture comprising 50 to 95 percent by weight of high density polyethylene and from 50 to 5 percent by weight of an ethylene-vinyl acetate copolymer wherein the vinyl acetate is present in a concentration of from about 5 to 35 percent by weight and the ethylene component in a concentration of from about 95 to 65 percent by weight.

And in a further object the polyblend resins of this invention are rotationally molded using a hot air or salt bath molding apparatus and in the substantial absence of any polyblend polymer degradation.

SUMMARY OF THE INVENTION

This invention comprises a high density polyethylene and ethylene-polar monomer polyblend produced by a melt blend technique which is very effective for use in rotational molding. The polyblend of this invention comprises a mixture of from 50 to 95 percent by weight of high density polyethylene and from 50 to 5 percent by weight of an ethylene-polar monomer copolymer wherein the ethylene component of said copolymer is in a concentration of from about 65 to 95 percent by weight and the polar monomer in a concentration of from about 35 to 5 percent by weight. Such polyblends produced by a melt blend technique have good low temperature properties, stress-crack resistance, and further are homogeneous and highly compatible. Also these polyblends are very suitable for producing rotationally molded articles.

DETAILED DESCRIPTION OF THE INVENTION

Broadly this invention is directed to a melt blended composition comprising a polyblend of from 50 to 95 percent by weight of a high density polyethylene and from 5 to 50 percent by weight of an ethylene-polar monomer copolymer. This copolymer has a composition consisting essentially of from 5 to 35 percent by weight of polar monomer and from 95 to 65 percent by weight of ethylene. The polar monomers useful in this invention include vinyl acetate, methyl methacrylate, vinylene carbonate, alkyl acrylates, vinyl halides and vinylidene halides. For simplicity purposes, and since it is a preferred species, this invention will be set out using vinyl acetate, but with the understanding that any one of the above noted species may also be used. By the use of a melt blend technique the high density polyethylene and vinyl acetate copolymer can be homogeneously mixed to form a polyblend of high compatibility and good stress-crack resistance. These polyblend polymers can then in a preferred mode of this invention be rotationally molded to form articles having the general advantageous properties of high density polyethylene (e.g., low temperature properties), and further having a high stress-crack resistant and good compatibility.

High density polyethylene as used in this invention has a density of from 0.940 to 0.965 and is preferably prepared by a low pressure process. The ethylene-polar monomer copolymers are generally known as to their properties and methods of synthesis. Ethylene-vinyl acetate copolymers are conveniently produced by the copolymerization of ethylene and vinyl acetate in the presence of oxygen or a peroxide catalyst. A preferred ethylene-vinyl acetate copolymer useful in this invention has a molecular weight of from 50,000 to 200,000 or more calculated on the basis of intrinsic viscosity, although copolymers in the molecular weight range of from 15,000 to 50,000 may also be operally used.

The polyblend compositions of the high density polyethylene and ethylene-vinyl acetate copolymers are prepared by a melt blending technique. Essentially this consists of having the high density polyethylene and the ethylene-vinyl acetate copolymer in a melt phase while they are dispersed one into the other. The heat to produce a melt phase can be supplied either by mechanical kneading such as a Banbury mixer, extruder or roll mill, or by use of an outside heat source. In a suitable technique a Banbury type mixer is employed with all of the components of the composition charged to the mixer at one time and mixed at a temperature sufficient to prepare a homogeneous blend. The necessary heat is supplied by the mechanical heat generated by the intense mixing, although the mixer has a water jacket through which a heating fluid can be passed. After a mixing period of from 4 to 12 minutes, cooling water is introduced around the mixer and the mixing speed is reduced so that the melt blend is reduced to a powder.

The melt blended polyblend compositions may then be utilized as prepared or in addition they can be subjected to a curing step. Curing may be by adding compounds which generate free radicals when heated, or by radiation. Radiation curing eliminates the inclusion of trace amounts of curing agent in the final polyblend. Suitable free radical generating compounds are the peroxides such as diacyl peroxides which include dicumyl peroxide, benzoyl peroxide and lauroyl peroxide, dialkyl peroxides, hydroperoxides, peracids, peresters, amine oxides, hydrazine salts and derivatives and N-chloro derivatives of amines or amides. It is preferable to select a curing agent which is relatively stable below 100° C. and substantially nonvolatile at curing temperatures. In a particular embodiment the high density polyethylene and ethylene-vinyl acetate polyblends are rotationally molded into various shapes. Sufficient polyblend and curing agent is charged to a mold to form a container having a 1/16 inch wall thickness. The mold is sealed and attached to spindles. The mold is set to rotate at 6 revolutions per minute (r.p.m.) about its major axis and at 20 r.p.m. about its minor axis, and the mold is heated to the melt range of the polyblend. The polyblend conforms to the shape of the mold which is then cooled to about room temperature. Cooling is by a water fog on the exterior surface of the mold. After cooling the mold is opened and the container removed. The molded container is translucent with no isolated islands or pock marks which would evidence a lack of polyblend homogeneity. The surface has good gloss, and the lack of any opacity is conclusive of a compatible polymeric polyblend. The container further exhibits exceptional stress-crack resistance.

The following examples are set out to further illustrate the present invention.

Example I

A high density, low pressure process polyethylene having a density of 0.950 and a melt index of 4.0 was used to prepare a series of polyblends of ethylene-vinyl acetate interpolymer using a Banbury type mixer followed by two roll milling. After milling into a sheet, the polyblend was diced into pellets for pulverizing into powder. Compression mold plaques were prepared from the powder, from which test samples were die cut. Conditioned specimens were tested according to ASTM D-1693-66 for stress-crack resistance and according to D-790-66 for flexural stiffness.

Test results are as follows:

| Percent polyethylene | Percent EVA (72% Eth/ 28% Va) | Stress-crack hrs., ASTM D-1693-66 | Flexural stiffness, p.s.i. ASTM D-790-66 |
|---|---|---|---|
| 100 | 0 | 5 | 148,000 |
| 90 | 10 | 20 | 103,000 |
| 75 | 25 | 65 | 87,000 |
| 65 | 35 | 501 | 68,000 |
| 50 | 50 | 450 | 40,000 |

It was found that by varying the proportions of the ethylene-vinyl acetate copolymer that we can obtain totally unexpected improvements in the stress-crack propties of the ethylene polymer. The data show that stress crack resistance increases to optimum at approximately 35% ethylene-vinyl acetate and then decreases at high ethylene-vinyl acetate content, reflecting a degree of incompatibility. However, the stress-crack resistance is appreciably improved over a 50% to 5% range of ethylene-vinyl acetate, 35% appearing to be the peak value within the range.

Example II

The procedure of Example I is repeated except that a 70 weight percent ethylene-30 weight percent polyvinyl chloride copolymer is used in place of the ethylene-vinyl acetate copolymer. On a similar data comparison as in Example I, it was found that optimum stress-crack resistance occurs at a concentration of 25 to 30 percent by weight of copolymer and 75 to 70 weight percent of the high density polyethylene. This polyblend composition also exhibits a high degree of compatibility. On flexing, molded articles maintain their clarity and do not contain opaque regions.

I claim:
1. The process of rotationally molding objects of high stress-crack resistance and compatibility comprising:
    charging a mold with a polyblend composition consisting essentially of from about 50 to 95 percent by weight of a high density polyethylene and from about 50 to 5 percent by weight of an ethylene-vinyl acetate copolymer wherein said vinyl acetate component is present in a concentration of from about 5 to 35 percent by weight with the remainder being said ethylene component;
    biaxially rotating said mold while heating said mold to the range of about 400° F. to 900° F;

maintaining the biaxial rotation of said mold and cooling said mold to about room temperature; and removing said article.

2. The process of claim 1 wherein said mold is rotated at from about 2 to 12 r.p.m. about the major axis and from about 5 to 40 r.p.m. about the minor axis.

References Cited
UNITED STATES PATENTS

| | | | |
|---|---|---|---|
| 3,293,344 | 12/1966 | Barnes et al. | 264—310 |
| 3,634,578 | 1/1972 | Suzuki | 264—310 |
| 3,445,551 | 5/1969 | Griffin | 264—310 |
| 3,542,912 | 11/1970 | Rielly et al. | 264—311 |
| 3,669,827 | 6/1972 | Kolyer et al. | 264—310 |

FOREIGN PATENTS

| | | | |
|---|---|---|---|
| 1,058,670 | 2/1967 | Great Britain | 260—897 R |
| 851,686 | 10/1960 | Great Britain | 260—897 R |
| 935,603 | 8/1963 | Great Britain | 260—897 R |

OTHER REFERENCES

"New Dimensions In Rotomolding," Modern Plastics, April 1966, Mc-Graw-Hill, New York, N.Y., pp. 86–90, 187, 188, 190.

ROBERT F. WHITE, Primary Examiner

J. R. THURLOW, Assistant Examiner

U.S. Cl. X.R.

260—897 B; 264—349